United States Patent [19]
Griffith et al.

[11] Patent Number: 4,629,844
[45] Date of Patent: Dec. 16, 1986

[54] INDUCTION HEATER HAVING AN ALTERNATING CURRENT CONDUCTOR

[75] Inventors: John T. Griffith, Clwyd; Carlos Lopez-Cacicedo; Stephen M. L. Hamblyn, both of Chester, all of United Kingdom

[73] Assignee: The Electricity Council, London, England

[21] Appl. No.: 770,133

[22] Filed: Aug. 28, 1985

[30] Foreign Application Priority Data

Aug. 28, 1984 [GB] United Kingdom ................. 8421762

[51] Int. Cl.⁴ .............................................. H05B 6/10
[52] U.S. Cl. ........................... 219/10.49 R; 219/10.51; 219/10.61 A; 219/10.79
[58] Field of Search .................. 219/10.49 R, 10.49 A, 219/10.51, 10.57, 10.61 A, 10.75, 10.79, 10.65, 10.69

[56] References Cited

U.S. PATENT DOCUMENTS

| | | | |
|---|---|---|---|
| 2,181,274 | 11/1939 | Jackson et al. | 219/10.49 R X |
| 2,904,664 | 9/1959 | Rothacker | 219/10.49 R |
| 3,107,268 | 10/1963 | Kraus | 219/10.65 X |
| 3,129,459 | 4/1964 | Kullgren et al. | 219/10.49 R X |
| 3,154,663 | 10/1964 | Halvorsen | 219/10.49 X |
| 3,297,811 | 1/1967 | Kugler | 219/10.49 R X |
| 3,529,116 | 9/1970 | Miyagi | 219/10.61 A |
| 4,039,794 | 8/1977 | Kasper | 219/10.49 R |
| 4,145,591 | 3/1979 | Takeda | 219/10.49 R |
| 4,238,337 | 12/1980 | Peters et al. | 219/10.49 R X |

FOREIGN PATENT DOCUMENTS

| | | |
|---|---|---|
| 434567 | 9/1926 | Fed. Rep. of Germany . |
| 2731487 | 1/1979 | Fed. Rep. of Germany . |
| 515457 | 4/1921 | France . |
| 606564 | 6/1926 | France . |
| 2339315 | 8/1977 | France . |
| 2393502 | 12/1978 | France . |
| 1557590 | 12/1979 | United Kingdom . |

*Primary Examiner*—Philip H. Leung
*Attorney, Agent, or Firm*—Beveridge, DeGrandi & Weilacher

[57] ABSTRACT

An induction heater has a conductor loop (1) in which a large alternating current is induced by a toroidal primary transformer (8). An annular secondary magnetic core (4) encircles a straight length of the conductor loop (1) and is itself enclosed by inner and outer cylinders (2 and 5) interconnected by annular end plates (6 and 9). The current in the conductor (1) produces magnetic flux in the core (4) which in turn produces axial heating currents in the cylinders (2 and 5). The inner cylinder (5) may have heated fins (3). An alternative embodiment has an inductively heated screw.

12 Claims, 3 Drawing Figures

INDUCTION HEATER HAVING AN ALTERNATING CURRENT CONDUCTOR

BACKGROUND OF THE INVENTION

This invention relates to an induction heater wherein material is heated by contact with an inductively heated heating element.

Bulk or continuous flow heaters are employed as dryers or calciners. Typically, a heating member contacts material to be heated so that heat is efficiently transferred from the heating element to the material to be heated. Some degree of mixing action to improve contact can also be incorporated with the heating action of the heating element, for example by providing the heating element with fin members, as a result contact between the heating element and the material to be heated is enhanced. However, it is preferably to provide substantially uniform heating of the material to be heated. Consequently, means aree required to supply heat uniformly to the heating member and the fin members thereof.

The supply of heat to the heating element is particularly problematical where fin members are included. Known dryers incorporate heating by means of gas jets or hot fluid. Consequently, in order to heat such fin members complicated supply tubing must be engineered into the fin member. It is also known to adapt the fin member to enhance the mixing resulting from movement of the heating element. This only serves to further complicate the design of the fin member. Particular problems are encountered with rotary drum dryers and calciners since it is necessary to incorporate rotary couplings for supply of the hot fluid or gases. Consequently, there are a number of drawbacks for heating the heating element of known bulk or continuous flow heaters.

SUMMARY OF THE INVENTION

The present invention provides an induction heater having an alternating current carrying conductor extending along an axis, a core means substantially encircling said axis to guide magnetic flux resulting from said alternating current, and a heating element for contacting and transferring heat to material to be heated, the heating element comprising an electrically conducting closed loop encircling magnetic fluix in the core means and being heated by electrical current induced thereby.

In this way, the heating element is remotely heated by induced electrical currents produced from the magnetic flux flowing in the core means. There is then no requirement to provide mechanical coupling between the heat energy source and the heating element. Furthermore, the heating element can have different shape arrangements to be heated by the electrical currents flowing therein.

Preferably the heating element is formed to encircle said axis so that material to be heated is enclosed within the heating element. In this way, for example, dust resulting from the induction heater can more easily be contained.

Preferably the heater includes means to deliver material into contact with the heating element, the heating element being adapted to effect relative movement between the material in contact and said axis. Therefore, contact and transfer of heat between the heating element and the material to be heated can be enhanced thereby providing more efficient transfer of heat from the heating element to the material to be heated. The heater can effect relative movement by causing the heating element to be moved periodically along or about said axis, or alternatively by causing the heating element to vibrate. Since the heating element is inductively heated, the provision of effecting relative movement does not further complicate supply of heat to the heating element.

Conveniently, the heating element includes at least one fin member whereby the surface area capable of contacting the material is increased. The fin member forms part of the electrically conducting closed loop encircling the magnetic flux and therefore some electrical current is induced in the fin member to heat it. It can therefore be seen that supply of heat specifically to the fin member is considerably simplified compared with the above mentioned bulk or continuous flow heaters.

In a preferred embodiment, a part of said loop formed by the heating element has an electrical resistance, per unit length in the direction around the lopp encircling the flux, which is higher than the resistance of the remainder of the loop. With this arrangement, a major part of the resistive heating of the heating element loop can take place at said higher resistance part, allowing a temperature gradient to be set up between this part and the remainder of the loop. As a result the magnetic core means located in the loop between the higher resistance part and the remainder, can be at a temperature below that of the high resistance part.

Preferably, heat insulation means is provided between said higher resistance part of the loop and the core means. Also, cooling means may be provided in or adjacent said remainder of the loop.

Examples of the present invention will now be described with reference to the accompanying drawings.

DESCRIPTION OF THE PREFERRED EMBODIMENT

Figure 1:
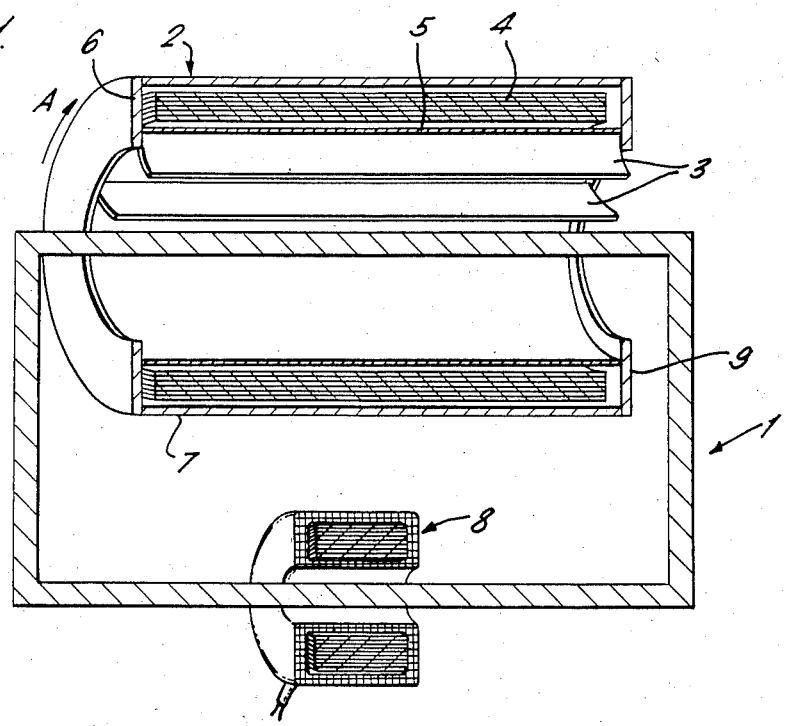
FIG. 1 illustrates a bulk induction heater embodying the present invention.

Referring to FIG. 1, a current carrying conductor 1 is shaped as a loop to pass through a primary transformer 8 at a convenient point. The conductor is typically made of copper and may be laminated to reduce the AC resistance. A portion of the conductor 1 forms an axis about which is provided a ferromagnetic core 4. The core 4 is enclosed within a metal skin formed from concentrically aligned inner cylinder 5 and outer cylinder 7 and end plates 6 and 9. In this way, the skin forms a closed electrically conducting loop about the core 4. The core 4 is typically formed from a laminated ferromagnetic material.

Alternating current set up in the conductor 1 by the toroidally wound transformer 8 sets up an alternating magnetic flux which is guided by the core 4. In turn, the alternating flux in core 4 induces currents to flow around the above mentioned electrically conducting closed loop. These currents flow in the direction of the axes of the cylinders 5 and 7.

Consequently, material to be heated can be placed within the inner cylinder 5 and be heated by the energy produced in the cylinder by the induced axial currents. To enhance contact between the material to be heated and the cylinder 5, fins 3 are provided on the axially facing side of the cylinder 5. It will be apparent that a suitable protective tube may be required to protect the conductor 1. The structure comprising the cylinders 5 and 7 and core 4 can be rotated in the direction of the arrow A. In this way, the material to be heated is moved into and out of contact with the cylinder 5 to allow uniform transfer of heat from the cylinder to the material to be heated. Heating the fin members 3 is advantageous because the material is in contact with a large heated surface area and is continually agitated or mixed. Such a heater can be employed as a bulk heater or can be tilted so that material gravitates towards one or other of the end plates 6 and 9 as the structure 2 is rotated. This form of heater has particular advantages when high air flows through the heater are undesirable for example when drying fine powders.

It will be apparent that by suitable arrangement of the induced currents flowing in the skin of the structure 2 high temperatures can be achieved, for example up to the Curie temperature of the core, whilst at the same time maintaining a high surface contact area. This has particular uses in claciners.

Figure 2:
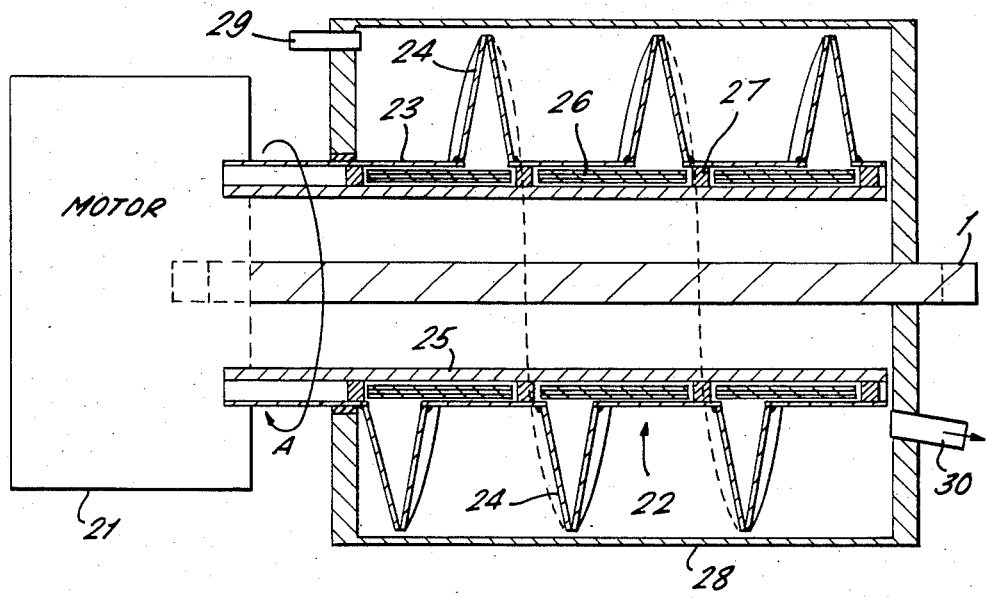
FIG. 2 illustrates a continuous flow induction heater embodying the present invention.

Referring to FIG. 2, a continuous flow induction heater is illustrated. A motor 21 rotates a screw structure 22. The screw structure 22 comprises an outer wall 23 which has a spiral slot cut in it to receive screw flight 24. The structure 22 also has an inner wall 25. A toroidal ferromagnetic core 26 is sandwiched between the inner and outer walls 23 and 25. To retain mechanical integrity between the inner and outer walls, the toroidal core is formed of several individual ring cores with stiffening ribs 27 disposed between adjacent rings. An electrically conducting conductor 1, corresponding to that shown in FIG. 1, runs along the axis of the structure 22. Thus, when alternating electrical current passes through conductor 1 magnetic flux is induced in the toroidal rings 26. The inner and outer walls 23 and 25 are arranged to form an electrically conducting closed loop around the toroidal cores 26 so that induced magnetic flux in the cores also induces electrical currents to flow in the walls 23 and 25 and the screw flight 24. The structure 22 is located within a can 28 having an inlet 29 and an outlet 30 as shown. Consequently, material entering at 29 contacts the structure and is urged towards outlet 30 by the screw flight 24 when the motor 21 rotates the structure 22 in the direction of the arrow A.

Thus, FIG. 2 illustrates a continuous flow induction heater having a heated screw flight. The heating of the flight and the supply of heat to the walls 23 and 25 is provided without complex rotary couplings.

It will be apparent that the heaters shown in FIGS. 1 and 2 are merely examples of induction heaters embodying the invention. For example, the rotary device shown in FIG. 2 could be applied to an extruder. The induction heater embodying the invention can be used to mix materials and heat them at the same time and has the advantage of providing a high heat transfer area between the heating element of the heater and the material to be heated.

Figure 3:
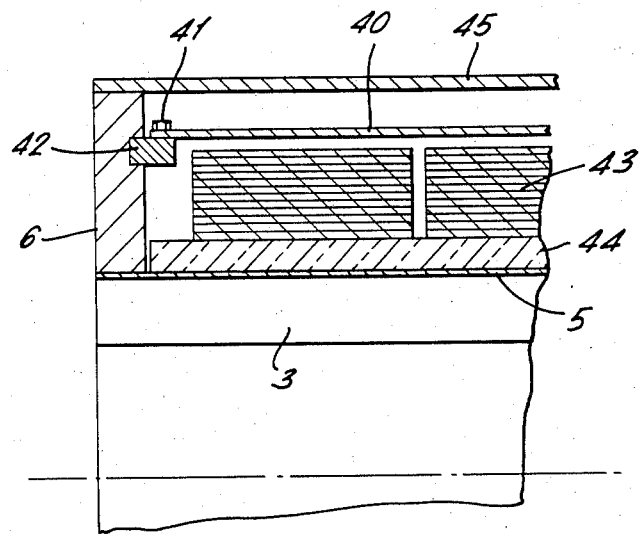
FIG. 3 is a part axial cross-section of a modified version of the FIG. 1 embodiment.

The maximum operating temperature of the heater is limited by the Curie temperature of the iron core. With the designs illustrated the inner and outer skins and the core tend in time to reach approximately the same temperature. FIG. 3 illustrates an example of a modification which can allow the hot elements of the heater to operate at temperatures above the temperature of the magnetic core.

In FIG. 3, the modification is shown as applied to the embodiment described above with respect to FIG. 1. The outer cylinder of the electrically conducting closed loop is formed to have an electrical resistance in the direction of the axis which is less than that of the inner cylinder 5 with fins 3. Thus, the outer cylinder is formed in this example of a copper cylinder 40 which is fastened at each end by means of bolts 41 to a copper mounting ring 42. The mounting ring 42 is secured, e.g. by electron beam welding to the associated annular end plate 6 or 9.

The inner cylinder 5 and fins 3 are made of a metal having the necessary mechanical strength and heat resistant qualities and also having an electrical resistivity such that the resistance along the axis of the combined inner cylinder 5 and fins 3 is higher, preferably substantially higher than the resistance of the copper cylinder 40. The inner cylinder 5 and fins 3 may be made of steel for example.

Because of the higher resistance of the inner cylinder 5 and fins 3, most of the heating energy is delivered to the inner cylinder 5 and fins 3 rather than the copper outer cylinder 40. As a result the outer cylinder 40 may be cooler than the inner cylinder 5, permitting a temperature gradient to be established between the inner and outer cylinders. The magnetic core 43 located between the inner and outer cylinder may thus be maintained at a temperature below that of the inner cylinder 5.

Preferably, a thermal insulation 44 is provided between the inner cylinder 5 and the magnetic core 43 to maximise the temperature difference between the inner cylinder 5 and the core. Further, the outer copper cylinder 40 may be perforated to permit air ventilation of the magnetic core 43.

An additional outer cylindrical casing 45, typically of steel, may be provided interconnecting the annular end plates 6 and 9 to provide additional mechanical rigidity and strength to the structure. The outer casing 45 may then also be perforated to permit passage of ventilating air to cool the core 43.

It will be appreciated that the above preferred construction may also be applied to other embodiments of the invention such as that illustrated in FIG. 2. In FIG. 2, the inner wall 25 would be made with an axial resistance lower than that of the outer wall 23 with screw flight 24, and thermal insulation would be provided between the outer wall 23 and the magnetic core 26. Ventilating air would be passed through the interior of the inner wall 25, which might be perforated, to cool the magnetic core.

We claim:

1. An induction heater having an alternating current carrying conductor extending along an axis, a core means substantially encircling said axis to guide magnetic flux resulting from said alternating current, and a heating element for contacting and transferring heat to material to be heated, the heating element comprising an electrically conducting closed loop encircling magnetic flux in the core means and being heated by electrical current induced thereby.

2. A heater as claimed in claim 1, wherein the heating element is formed to encircle said axis.

3. A heater as claimed in claim 2, including inlet means to deliver material into contact with the heating element, and driving means for moving the heating element to effect relative movement between the material in contact and said axis.

4. A heater as claimed in claim 3, wherein the driving means periodically moves the heating element along said axis.

5. A heater as claimed in claim 3, wherein the driving means vibrates the heating element.

6. A heater as claimed in claim 1, wherein the heating element includes at least one fin member whereby the surface area capable of contacting the material is increased.

7. A heater as claimed in claim 1, wherein a part of said loop formed by the heating element has an electrical resistance, per unit length in the direction around the loop encircling the flux, which is higher than the resistance of the remainder of the loop.

8. A heater as claimed in claim 7 and including heat insulation means between said higher resistance part of the loop and the core means.

9. A heater as claimed in claim 7 wherein cooling means are provided in or adjacent said remainder of the loop.

10. A heater as claimed in claim 9 wherein said cooling means comprises perforations in said remainder of the loop to permit increased ventilation of the core means.

11. A heater as claimed in claims 7, wherein the heating element comprises inner and outer cylinders coaxial with the axis, and annular and plates interconnecting the cylinders, said core means being located between said inner and outer cylinders, one of said inner and said outer cylinders having an electrical resistance which is higher than the other.

12. A heater as claimed in claim 11 wherein the inner cylinder has the higher resistance.

* * * * *